June 24, 1947.  T. G. NYBORG  2,422,977

MECHANICAL LOADER

Filed Nov. 23, 1943   2 Sheets-Sheet 1

Inventor
Tage G. Nyborg
By
Attorney

June 24, 1947.    T. G. NYBORG    2,422,977
MECHANICAL LOADER
Filed Nov. 23, 1943    2 Sheets-Sheet 2

Tage G. Nyborg
Inventor

By
Attorney

Patented June 24, 1947

2,422,977

UNITED STATES PATENT OFFICE 2,422,977

MECHANICAL LOADER

Tage Georg Nyborg, Worcester, England, assignor of one-half to The Mining Engineering Company Limited, Worcester, England Application November 23, 1943, Serial No. 511,434
In Great Britain November 23, 1942

3 Claims. (Cl. 262—1)

This invention provides means for the mechanical loading of broken material more particularly the loading of undercut and blasted coal on the coal face in underground mining practice.

It is primarily designed to make possible a new method of longwall mining in which a loading machine of the kind including a wide mouthed reciprocating loading shovel and its associated trough, operates along the face in one direction in conjunction with a conveyor (usually a shaker or jigging conveyor) extended in the track of the machine as the material in front of the machine is loaded and the track of the machine cleared, and the machine is flitted back in the other direction between the conveyor and the face. The face can then be undercut (preferably by a cutting machine operating in the same direction as the loading machine and subsequently flitted back with the latter) and the loading machine and conveyor advanced ready for the next loading operation. For this purpose the base and shovel of the loading machine are divided longitudinally, so that the sections can be separated and flitted back one behind the other between the conveyor and the face. It may sometimes be necessary or convenient to dismantle the conveyor sections or incline them, to give extra room; but they will in any case have to be advanced towards the face and the conveyor extended behind the loading machine on the next loading run. The convenience and economy of the method in any case will appear as the description proceeds. It will be seen that the delivery is to a face conveyor disposed to one side of the machine and of the mouth of the shovel; the conveyor can overlap up to half of the width of the shovel on the goaf side of the machine and the driving and advancing mechanism lies behind the remainder or extending part of the shovel. By dividing the machine (including the shovel) about a line approximately central and parallel to the direction of travel, the two sections can be flitted back one behind the other, preferably behind the cutting machine.

When loading and particularly when pushing the machine into the broken material by means located on the face side of the conveyor, there is a tendency to twist the machine out of its straight course. A suitable incline on the extension of the shovel in front of the mechanism of the machine will be useful in counteracting this tendency.

Other parts of the invention are embodied in the arrangements shown by the accompanying drawings, which are diagrammatic, showing what is essential to its understanding and omitting mechanical details within the competence of those skilled in the art to supply without difficulty once the invention and its objects are understood.

Figure 1:
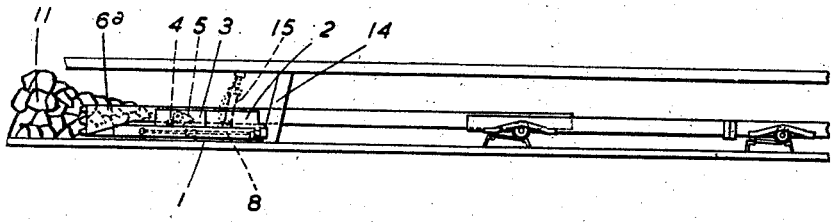
Fig. 1 is an elevation of the apparatus as viewed from the face side.

The loading machine comprises a base plate 1 on which are mounted the driving motor (and starter) 2, either electric or compressed air, coupled to a reduction gear box 3 and mechanism including a crank 4 and connecting link 5 producing reciprocating motion on the shaker conveyor cycle and driving a wide mouthed loading shovel 6 and its associated trough 7 mounted on guides 8 so that it can reciprocate in the plane of the base plate. A part 6a of the shovel extends to the wall in front of the driving parts and is provided with picks up to at least the height of the mechanism behind and the base plate, shovel and driving coupling to the shovel are divided in to two sections about a line 10 approximately central and parallel to the direction of travel for the purpose of facilitating flitting. The loading machine can be moved into the pile of broken material 11 in known ways, but in the preferred method shown an oil pump and reservoir unit 9 which may be fitted with a relief valve and arranged to be driven from the gear box is used to supply oil to a hydraulic cylinder 12 with a ram 13 which pushes the machine forward by forcing the ram out from the cylinder towards relative position indicated in dotted lines, the end of the ram bearing against a prop 14 which is set after each completed move forward. A prop 15 is also indicated in Fig. 1, carried from the base of the machine though it will generally only be required when working up steep gradients, to prevent the shovel sliding back. A loading machine discharge trough 17 is shown coupled on, serving as a telescopic trough delivering the material to the face conveyor 18.

The general method of operation when loading is to start up the whole plant and advance the loading machine slowly into the broken material. This is picked up by the reciprocating loading shovel, passed along its associated trough and discharged into the following conveyor. When the advance is such that the trough has come to the end of the conveyor the machine is stopped while another section is put into the following conveyor.

Figure 2:
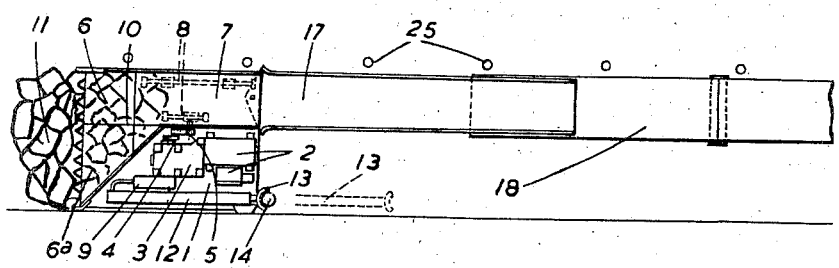
Fig. 2 is a plan of the same.

Referring to Figs. 3 to 7, it will be observed that the machine shown works with the wall to the right, not to the left as in Figs. 1 and 2.

Figure 3:
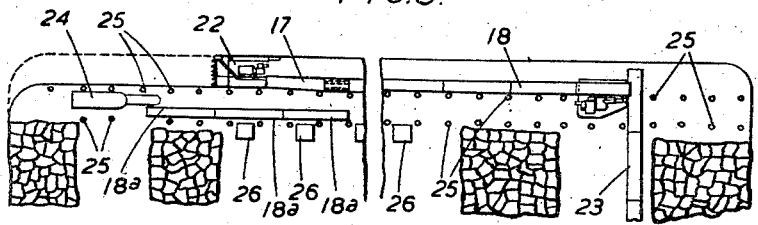
Fig. 3 is a diagrammatic view showing the coaling operation in progress.
Figure 4:
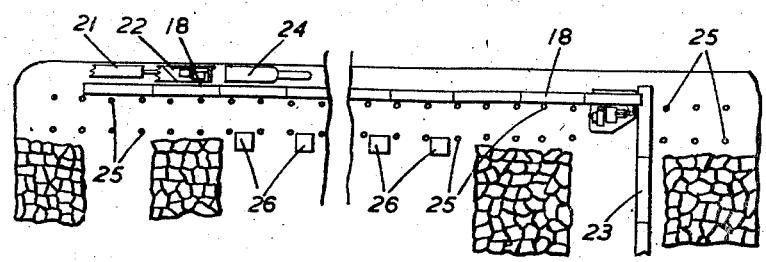
Fig. 4 is a diagrammatic view showing a flitting back after coaling.
Figure 5:
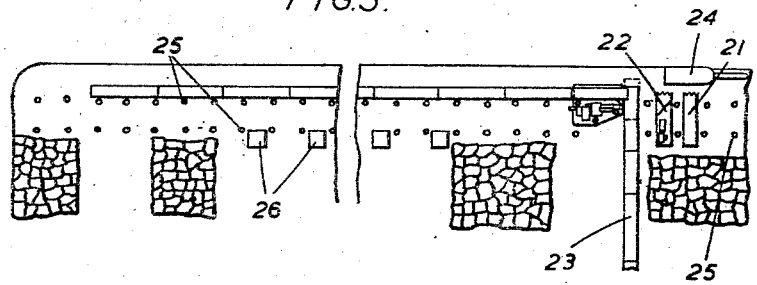
Fig. 5 is a diagrammatic view showing the cutting and loading plant stabled after flitting.
Figure 6:
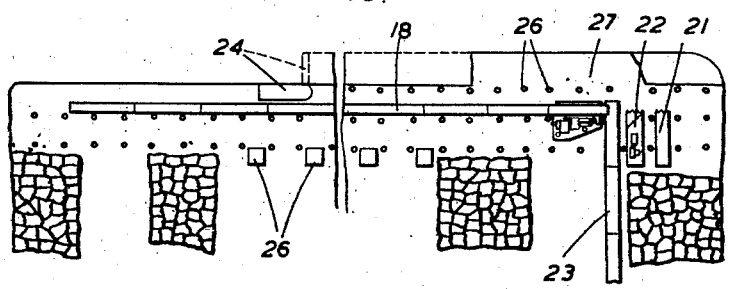
Fig. 6 is a diagrammatic view showing the undercutting and the making of a stable hole in progress.
Figure 7:
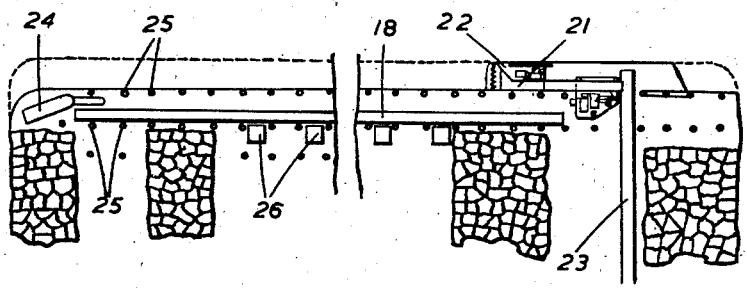
Fig. 7 is a diagrammatic view of the completion of a cycle preparatory to coaling on a new face.

Fig. 3 shows the operation of coaling, the two sections of the loading machine being designated 21 and 22. The conveyor sections 18a are successively used to extend the face conveyor 18. The face conveyor loads onto the gate conveyor 23. The cutting machine 24 is at this time in the position shown between the props 25 at the end of the face and chocks are indicated at 26. Fig. 4 shows the cutting machine 24 and the two separated sections 21, 22 of the loading machine being flitted back after completion of coaling; Fig. 5 shows them stabled beyond the gate. The operations of Figs. 3 to 5 might perhaps represent one shift for three men. Fig. 6 illustrates the next series of operations, namely undercutting by the cutting machine 24, drilling, making stable hole at 27 to enable the loading machine to be put in position for its next loading run. These operations would perhaps represent one shift for seven men. Fig. 7 illustrates the series of operations to complete the cycle, namely, ripping road and packing, advancing chocks and drawing timber, reassembling the loading machine in the stable hole, extending the gate conveyor as necessary and advancing the face conveyor ready for it to be extended behind the loading machine in the coaling operation of Fig. 3 to follow. These operations would perhaps represent one shift for nine men, so that the complete cycle for (say) 120 yards face would employ in all perhaps nineteen men.

I claim:

1. A loading machine for longwall mining including a wide mouthed shovel, a motor, mechanism driven by the motor to reciprocate the shovel, a trough adapted to receive material from the shovel and arranged so that it will feed a face conveyor disposed to one side of the machine and of the mouth of the shovel, the said motor and mechanism being arranged in a space representing the distance between a corner of the mouth of the shovel and the adjacent edge of the trough, the shovel extending back at an incline from the said corner to the trough and the said motor and mechanism lying behind the incline.

2. A loading machine for longwall mining including a wide mouthed shovel, a motor, mechanism driven by the motor to reciprocate the shovel, pushing mechanism to advance the shovel, a trough adapted to receive material from the shovel and arranged to feed a face conveyor disposed to one side of the machine and of the mouth of the shovel, the said motor and mechanism being arranged in a space representing the distance between a corner of the mouth of the shovel and the adjacent edge of the trough, a part of the said shovel adjacent to the said corner extending up the back of the face side to clear the coal completely out of the path of the said motor, reciprocating mechanism and pushing mechanism.

3. A loading machine as in claim 2 having picks provided upon the said part of the said shovel up to at least the height of the said motor, reciprocating mechanism and pushing mechanism.

TAGE GEORG NYBORG.

REFERENCES CITED

The following references are of record in the file of this patent:

UNITED STATES PATENTS

| Number | Name | Date |
|---|---|---|
| 1,116,356 | Morgan | Nov. 3, 1914 |
| 1,212,382 | Morgan | Jan. 16, 1917 |
| 1,263,528 | Chabla | Apr. 23, 1918 |
| 1,785,196 | Holmes | Dec. 16, 1930 |
| 1,880,090 | Hughes | Sept. 27, 1932 |
| 2,093,448 | Joy | Sept. 11, 1937 |
| 2,234,071 | Bebinger | Mar. 4, 1941 |
| 2,276,426 | Sloane | Mar. 17, 1942 |
| 2,281,503 | Levin | Apr. 28, 1942 |

FOREIGN PATENTS

| Number | Country | Date |
|---|---|---|
| 290,756 | Great Britain | May 22, 1928 |
| 502,037 | Germany | July 7, 1930 |